United States Patent
Segawa et al.

(10) Patent No.: US 6,565,483 B2
(45) Date of Patent: May 20, 2003

(54) SLIP CONTROL SYSTEM OF TORQUE CONVERTER

(75) Inventors: Satoshi Segawa, Kanagawa (JP); Kazutaka Adachi, Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 09/996,605

(22) Filed: Nov. 30, 2001

(65) Prior Publication Data
US 2002/0077218 A1 Jun. 20, 2002

(30) Foreign Application Priority Data
Dec. 20, 2000 (JP) ........................ 2000-386495

(51) Int. Cl.[7] .............................................. B60K 41/02
(52) U.S. Cl. ...................................................... 477/174
(58) Field of Search .......................... 477/86, 174, 175, 477/176

(56) References Cited

U.S. PATENT DOCUMENTS

| 5,779,595 A | * | 7/1998 | Kono et al. ................ 477/174 |
| 5,853,350 A | * | 12/1998 | Hasegawa et al. ...... 477/174 X |
| 6,066,072 A | | 5/2000 | Adachi ....................... 477/176 |
| 6,132,336 A | | 10/2000 | Adachi et al. ............. 477/169 |
| 6,478,717 B1 | * | 11/2002 | Yu ................................ 477/175 |

FOREIGN PATENT DOCUMENTS

| JP | 11-82726 | 3/1999 |
| JP | 11-141677 | 5/1999 |

* cited by examiner

Primary Examiner—Rodney H. Bonck
Assistant Examiner—Roger Pang
(74) Attorney, Agent, or Firm—Foley & Lardner

(57) ABSTRACT

A controller of a slip control system of a torque converter with a lock-up clutch is configured to carry out calculating a target slip rotation speed of the converter based on a vehicle speed and an open degree of a throttle valve; calculating a running condition of the vehicle, which includes drive and coast conditions, based on the operation condition of the throttle valve; calculating a torque converter characteristic with reference to a speed of a turbine of the converter and the running condition of the vehicle; calculating a target converter torque based on the torque converter characteristic; calculating a target lock-up clutch engaging torque based on the target converter torque and an engine torque; and outputting an instruction signal to an actuator to provide the lock-up clutch with the target lock-up clutch engaging torque. The torque converter characteristic is represented by two groups of maps, one being for the drive running condition and other being for the coast running condition.

16 Claims, 12 Drawing Sheets

SLIP CONTROL SYSTEM OF TORQUE CONVERTER

BACKGROUND OF INVENTION

1. Field of Invention

The present invention relates in general to control systems for controlling a torque converter used with an automatic transmission and more particularly to control systems of a type that controls a relative rotation (or slip rotation) between input and output elements of the torque converter. More specifically, the present invention is concerned with a slip control system for converging the slip rotation of the torque converter to a target level.

2. Description of Related Art

The torque converter is a device that carries out a power transmission between input and output elements through a fluid. Thus, the torque converter is somewhat poor in having a satisfied power transmission efficiency although it exhibits a good torque fluctuation absorbing function and a good torque multiplying function.

Accordingly, nowadays, a so-called lock-up type torque converter has been widely used, which, under a vehicle running condition wherein the torque fluctuation absorbing and torque multiplying functions are not actually needed by the torque converter, establishes a locked engagement between the input and output elements of the torque converter using a lock-up clutch.

Some of the lock-up type torque converters are of an ON/OFF type which establishes either the lock-up mode or the torque converter mode depending on running condition of the vehicle. However, in this ON/OFF type, it is difficult to solve or minimize residual noises and shocks that are produced when the converter makes switching between ON and OFF conditions. In fact, for reducing such residual noises and shocks, a suitable slip rotation of the torque converter is needed at the switching. However, due to nature of the ON/OFF type, the torque converter has a limitation in a slip control range, and thus it is difficult to further improve the transmission efficiency of a torque converter with such ON/OFF type.

SUMMARY OF INVENTION

In order to solve the above-mentioned problem, various slip control systems for the torque converter have been hitherto proposed. One of them is of a system wherein a slip control range is so set that with the lock-up clutch being left in a so-called half-engaged condition (viz., slip control condition), the slip rotation of the torque converter is so controlled or restricted as to assure the minimum torque fluctuation absorbing and toque multiplying functions. With this, the slip rotation control can be effected at a much lower vehicle speed range.

In general, in the above-mentioned slip control system, a target slip rotation speed is determined in accordance with vehicle operation factors, such as engine throttle opening, vehicle speed, temperature of hydraulic fluid of the transmission, etc., and the engaging force of the lock-up clutch is so controlled that, in the above-mentioned slip control range, the real slip rotation speed is finally controlled or converged to the target slip rotation speed. According to the above-mentioned slip control system, from a theoretical point of view, the slip rotation control can be extended to much lower speed range without suffering from residual noises and shocks and thus improvement in fuel consumption is achieved avoiding deterioration of drivability of the vehicle.

However, in fact, since the engaging force of the lock-up clutch for controlling the slip rotation speed can not be theoretically controlled, shocks and residual noises tend to be produced due to a temporary engagement of the lock-up clutch.

In order to solve such problem, the same applicants have hitherto proposed slip control systems which are shown in Laid-open Japanese Patent Application (Tokkai Hei) 11-82726 and Laid-open Japanese Patent Application (Tokkai Hei) 11-141677. However, as will be described hereinafter, even the slip control systems of these publications have failed to exhibit a satisfied performance in the slip rotation control.

It is therefore an object of the present invention to provide a slip control system of a torque converter, which is thought out by taking the measures disclosed by the publications into consideration.

According to a first aspect of the present invention, there is provided a slip control system of a torque converter with a lock-up clutch, the slip control system controlling a slip rotation speed between input and output elements of the torque converter by controlling an engaging condition of the lock-up clutch, the slip control system comprises a sensor that detects a speed difference between the input and output elements of the torque converter; a sensor that detects an operation condition of a throttle valve of the engine; a sensor that detects an output torque of the engine; an actuator that controls the engaging condition of the lock-up clutch in accordance with an instruction signal applied thereto; and a controller which is configured to carry out calculating a target slip rotation speed of the torque converter based on a vehicle speed and an open degree of the throttle valve; calculating a running condition of the vehicle based on the operation condition of the throttle valve, the running condition including a drive condition wherein the speed of the input element of the torque converter is higher than that of the output element and a coast condition wherein the speed of the input element is lower than that of the output element; calculating a torque converter characteristic with reference to a speed of the output element of the torque converter and the running condition of the vehicle, the torque converter characteristic being represented by a relation between a converter torque to be transmitted by the torque converter and a slip rotation of the torque converter; calculating a target converter torque based on the torque converter characteristic, the target converter torque being a converter torque provided when the torque converter carries out a slip rotation at the target slip rotation speed; calculating a target lock-up clutch engaging torque based on the target converter torque and the engine torque; and outputting an instruction signal to the actuator to provide the lock-up clutch with the target lock-up clutch engaging torque.

According to a second aspect of the present invention, there is provided a method of controlling a slip control apparatus of a torque converter with a lock-up clutch, the slip control apparatus controlling a slip rotation speed between input and output elements of the torque converter by controlling an engaging condition of the lock-up clutch, the slip control apparatus including a sensor that detects a speed difference between the input and output elements of the torque converter; a sensor that detects an operation condition of a throttle valve of the engine; a sensor that detects an output torque of the engine; and an actuator that controls the engaging condition of the lock-up clutch in accordance with an instruction signal applied thereto. The method comprises calculating a target slip rotation speed of the torque converter based on a vehicle speed and an open degree of the throttle valve; calculating a running condition of the vehicle based on the operation condition of the throttle valve, the running condition including a drive condition wherein the speed of the input element of the torque converter is higher than that of the output element and a coast condition wherein the speed of the input element is lower than that of the output element; calculating a torque converter characteristic with reference to a speed of the output element of the torque converter and the running condition of the vehicle, the torque converter characteristic being represented by a relation between a converter torque to be transmitted by the torque converter and a slip rotation of the torque converter; calculating a target converter torque based on the torque converter characteristic, the target converter torque being a converter torque provided when the torque converter carries out a slip rotation at the target slip rotation speed; calculating a target lock-up clutch engaging torque based on the target converter torque and the engine torque; and outputting an instruction signal to the actuator to provide the lock-up clutch with the target lock-up clutch engaging torque.

DETAILED DESCRIPTION OF INVENTION

In order to assist understanding of the present invention, the slip control systems proposed by the above-mentioned two Japanese Patent Publications will be analyzed before making a detailed description on a slip control system of the present invention.

The slip control system shown in the publication 11-82726 is based on an understanding wherein, under a slip control condition of the torque converter, the input torque of the converter (viz., engine output torque) corresponds to the sum of the converter torque by the hydraulic transmission of the converter and the engaging capacity of the lock-up clutch. Based on a certain relation between the converter torque and the slip rotation speed that is previously derived from the transmission performance of the torque converter, a target converter torque is calculated, which is needed for obtaining a slip rotation command value for converging the real slip rotation speed to the target slip rotation speed. By subtracting the target converter torque from the engine output torque, a target lock-up clutch engaging capacity is obtained. The engaging pressure of the lock-up clutch is so controlled as to actualize the target lock-up clutch engaging capacity.

In the proposed slip control system of the publication, by applying a linearization compensation to the control that converges the real slip rotation speed to the slip rotation command value, the control accuracy in slip rotation control is increased.

In the slip control system shown in the publication 11-141677, to the target slip rotation speed of the torque converter, there is set a compensating filter depending on the operation condition of the vehicle. With this, the target slip rotation speed is compensated or corrected and thus the control accuracy in slip rotation control is increased.

That is, in the slip control system of the publication 11-82726, in order to derive the lock-up clutch engaging pressure for realizing the target lock-up clutch engaging capacity, a map is used that shows the relation between the target lock-up clutch engaging capacity and the lock-up clutch engaging pressure. The map is used in both a coast running condition of the vehicle wherein the accelerator pedal is released and a drive running condition of the vehicle wherein the accelerator pedal is depressed. However, the applicants have found that this slip control system has some weak points.

That is, at a moment (t), the following equation is established among an engine output torque tEH, a converter torque tCNVC and a lock-up clutch engaging capacity tLU:

$$tEH(t) = tLU(t) + tCNVC(t) \tag{1}$$

Figure 12:
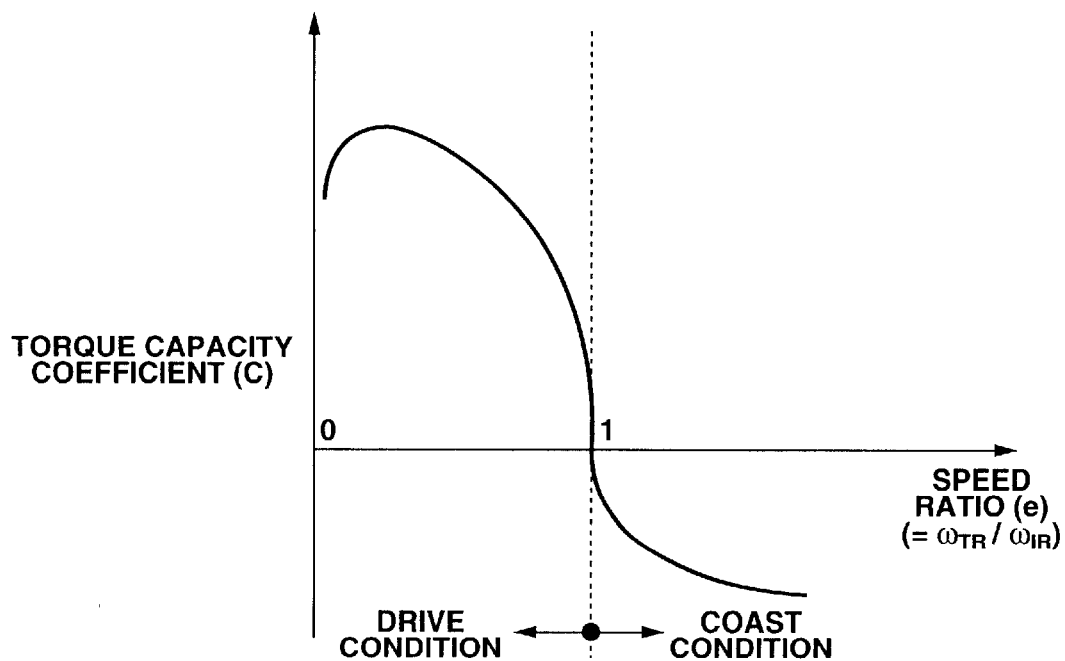
FIG. 12 is a graph showing a variation of torque capacity factor relative to a torque converter speed ratio, with respect to the vehicle running condition.

Regarding the converter torque tCNVC, a torque capacity coefficient (C) according to the speed ratio "e" of the torque converter proper (viz., =turbine speed ωTR/pump impeller speed ωIR) is previously derived as is shown in the graph of FIG. 12. Thus, looking up "C" from the graph, the converter torque tCNVC can be derived from the following equation:

$$tCNVC(t) = C \cdot \omega IR^2 \tag{2}$$

Considering a case wherein the slip rotation speed is increased (viz., in absolute value) in the slip control in coast running condition, a real slit rotation speed ωSLPR is obtained by subtracting the turbine speed ωTR from the engine speed (or pump impeller speed) ωIR. That is:

$$\omega SLPR = \omega IR - \omega TR \tag{3}$$

In the coast running condition, ωIR is smaller than ωTR. Thus, the above-mentioned speed ratio "e" can be expressed from the following equation:

$$e = \omega TR/\omega IR > 1 \tag{4}$$

Accordingly, as is seen from FIG. 12, in the range (vz., coast running condition) where the speed ratio "e" is greater than 1 (one), the converter torque tCNVC exhibits a negative value because the torque capacity coefficient C of the torque converter shows a negative value.

When, under this condition, it is intended to increase the slip rotation speed ωSLPR, that is, to increase the speed ratio "e", it becomes necessary to reduce the converter torque tCNVC.

Figure 13:
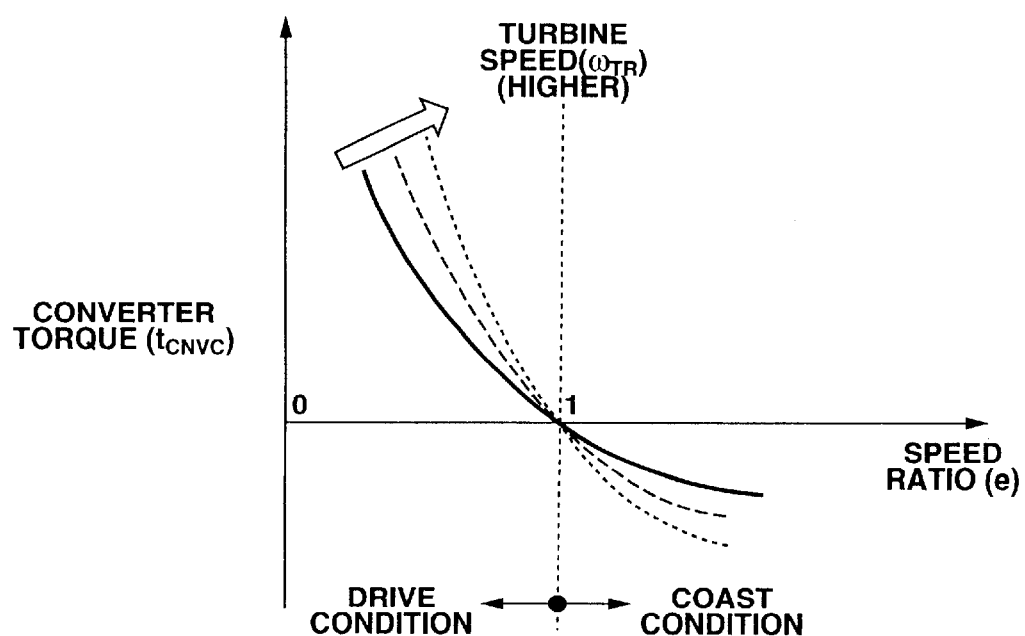
FIG. 13 is a graph showing a variation of converter torque relative to the torque converter speed ratio, with respect to the vehicle running condition.

FIG. 13 is a graph showing a change of the converter torque ωCNVC when the speed ratio "e" changes in each turbine speed ωTR. From this graph, it is also seen that for increasing the speed ratio "e", reduction of the converter torque tCNVC is needed.

Referring back to the equation (1), when, with the engine output torque tEH being constant, it is intended to increase the slip rotation speed ωSLPR in coast running condition, that is, to decrease the converter torque tCNVC, it is necessary to increase the lock-up clutch engaging capacity tLU.

In the slip control system of the publication 11-82726, however, a lock-up clutch engaging capacity map is used on the assumption that the slip rotation speed ωSLPR is in drive running condition irrespective of the direction of the slip rotation speed ωSLPR, that is, irrespective of whether the condition is drive running condition (viz., ωIR>ωTR) or coast running condition (viz., ωIR<ωTR).

However, actually, the relation between the lock-up clutch engaging capacity and the engaging pressure needed for establishing the engaging capacity differs in drive and coast running conditions. That is, the relation in drive running condition is shown in graph of FIG. 8, while the relation in coast running condition is shown in graph of FIG. 9. That is, the two relations have mutually opposed characteristics.

Figure 8:
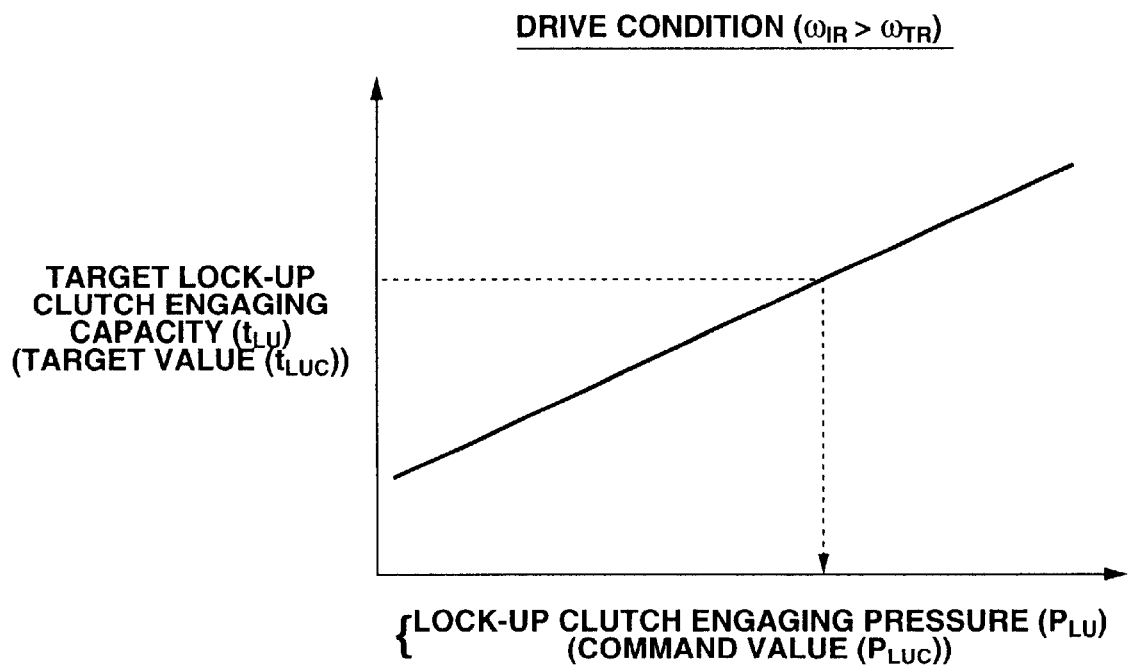
FIG. 8 is a graph showing a relation between a lock-up clutch engaging pressure and a lock-up clutch engaging capacity in drive running condition.

Irrespective of the above-mentioned fact, in the slip control system of the publication 11-82726, the lock-up clutch engaging capacity map corresponding to the graph of FIG. 8 for drive running condition is used even when the vehicle is under coast running condition. That is, in such case, even when there is a demand of increasing the slip rotation speed ωSLPR, a counter operation inevitably takes place to increase the lock-up clutch engaging pressure. That is, against the demand, the slip rotation speed ωSLPR is reduced, which is a first weak point possessed by the slip control system of the publication 11-82726.

In addition to the above-mentioned first weak point, the slip control system of the publication has a second weak point which will be described in the following.

That is, in order to derive the converter torque tCNVC needed for obtaining the lock-up clutch engaging capacity tLU for realizing a target slip rotation speed by using the above-mentioned equation (1), the following steps are actually used. That is, a relation between the torque converter output speed and a slip rotation speed gain that defines the rate of the slip rotation speed relative to the converter torque induced by the fluid power transmission of the converter is previously found by various experiments. Then, based on this relation previously found, a slip rotation speed gain corresponding to a certain torque converter output speed is searched. Then, by dividing a target slip rotation speed by the searched slip rotation speed gain, the target converter torque tCNVC for establishing the slip rotation speed is obtained.

As is described hereinabove, in the slip control system of the publication 11-82726, the slip rotation speed gain map provided exclusively for drive running condition is used in both drive and coast running conditions that have opposite directions in the slip rotation. This brings about the second weak point of the system.

Figure 6:
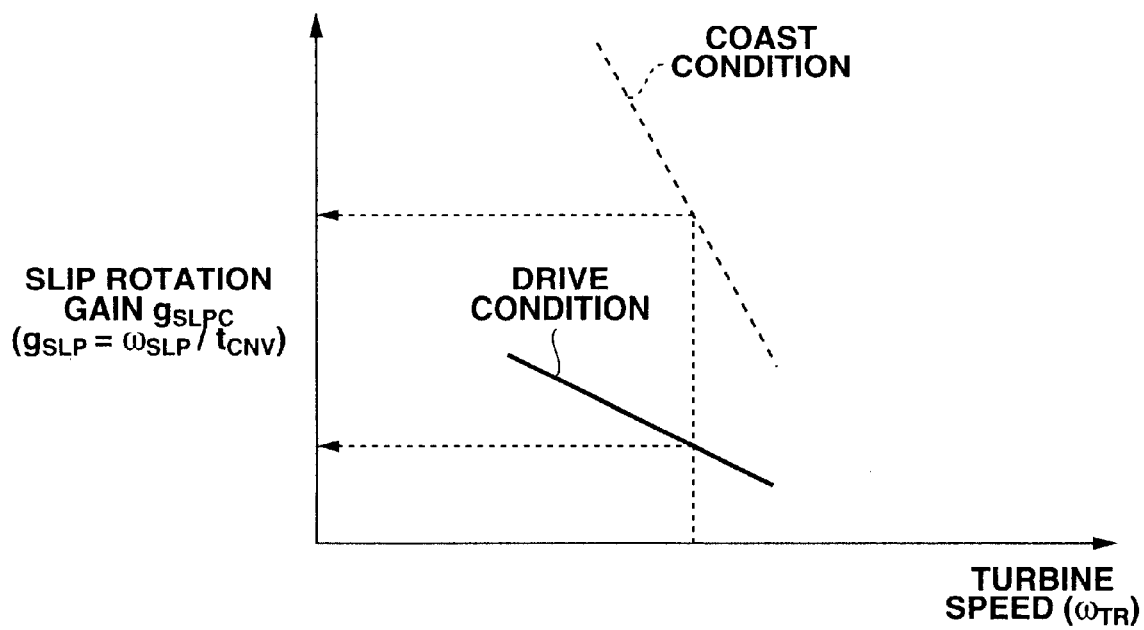
FIG. 6 is a graph showing a relation between a slip rotation speed gain and a turbine speed in both drive and coast running conditions.

That is, as is seen from the graph of FIG. 6, actually, the relation between the slip rotation speed gain and the torque converter output speed shows different characteristics in drive and coast running conditions. That is, in these two running conditions, the slip rotation speed gain has different values to the same torque converter output speed.

Accordingly, even when the target slip rotation speed is the same, there is produced a difference in the target converter torque between drive and coast running conditions.

Irrespective of the above-mentioned fact, the slip control system of the publication 11-82726 uses the slip rotation speed gain map, which is exclusively provided for drive running condition, also in coast running condition. Of course, in this case, the system fails to obtain a slip rotation speed gain that accurately corresponds to a desired slip rotation speed, and thus, the slip control by the system is deteriorated, which is the second weak point of the system of the publication.

Figure 14:
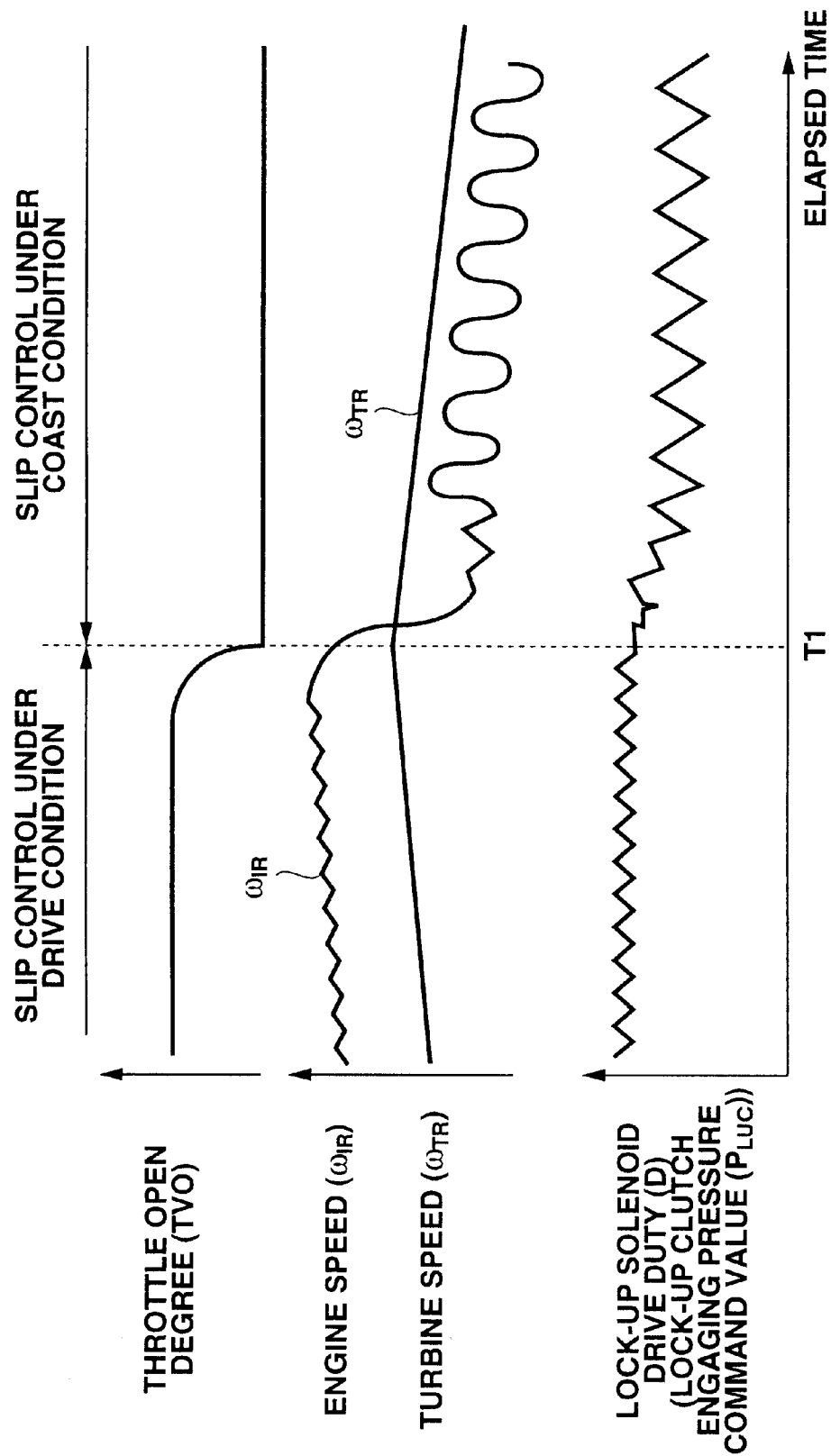
FIG. 14 is an operation time-chart similar to FIG. 10, but showing a case of a known slip control system wherein an unstable slit rotation appears.
Figure 15:
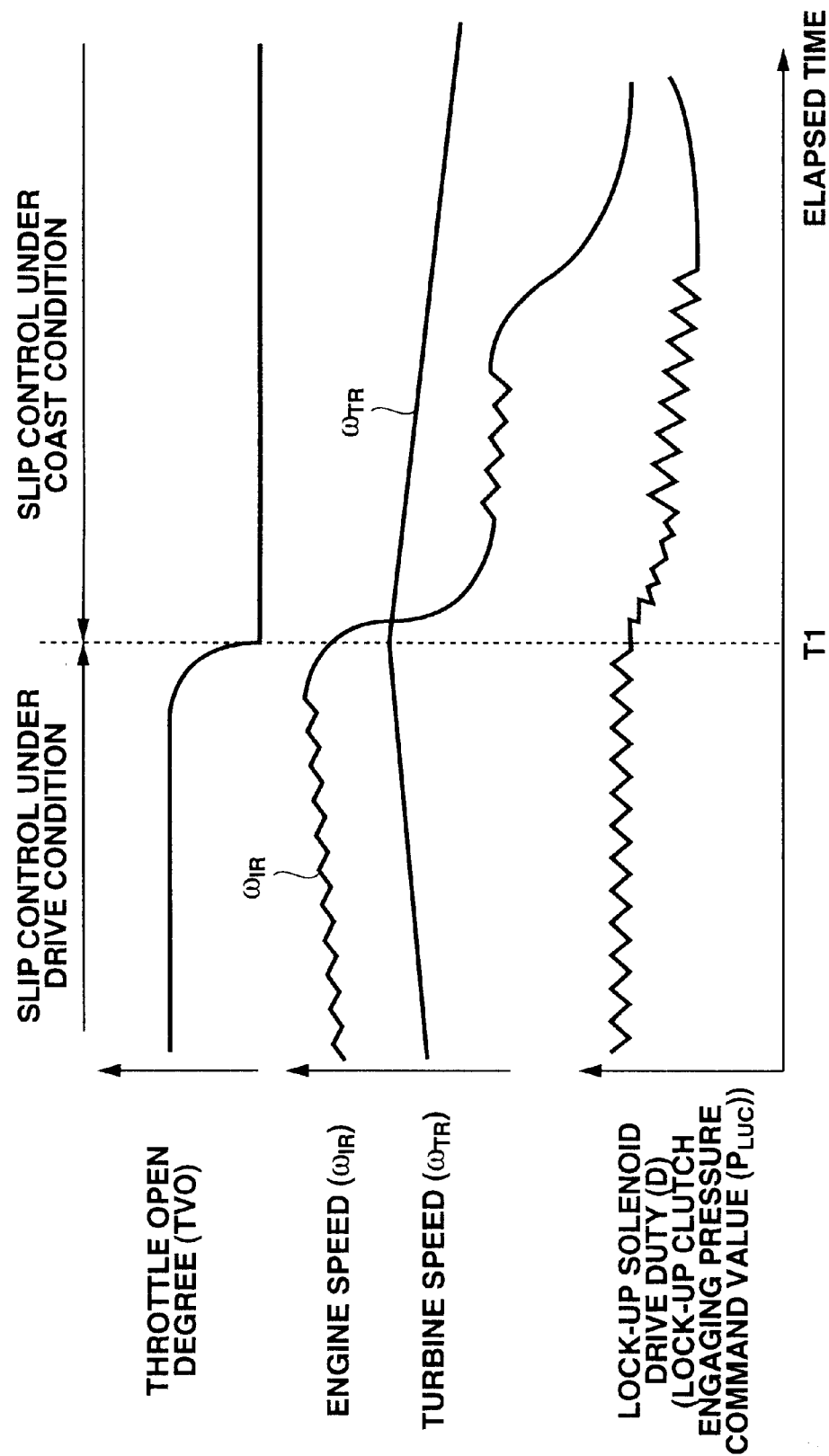
FIG. 15 is an operation time-chart similar to FIG. 10, but showing a case of the known slip control system wherein the torque converter become into a torque converter mode without properly keeping a slip condition.

This will be well understood from the following description directed to the time-charts of FIGS. 14 and 15.

That is, if, just at a moment T1, the throttle open degree TVO is changed to a smaller value changing the condition from drive running condition to coast running condition, the change of the engine rotation speed ωIR appearing after the moment T1 shows an instability in the slip rotation speed, as is seen from FIG. 14, which would cause production of the residual noises and shocks.

Furthermore, as is seen from the time-chart of FIG. 15, the change of the engine rotation speed ωIR appearing after the moment T1 shows that the torque converter becomes into the torque converter mode without properly keeping the slip condition. Of course, in this case, fuel saving effect featured by the slip control is inevitably lowered.

While, in the slip control system proposed in the publication 11-141677, the following third weak point tends to appear due to its inherency wherein the target slip rotation speed and the real slip rotation speed are subjected to an absolute value processing to obtain absolute values thereof and these absolute values are used for carrying out the slip control.

That is, in case wherein a target slip rotation speed in drive running condition and that in coast running condition have the same absolute value, the target slip rotation value inputted to the compensating filter inevitably shows the same value in both drive and coast running conditions. Thus, the output from the compensating filter can not show a difference between the two running conditions. That is, when the condition changes from drive running condition to coast running condition and vice versa, a desired response or control is not realized, which is the third weak point.

Figure 16:
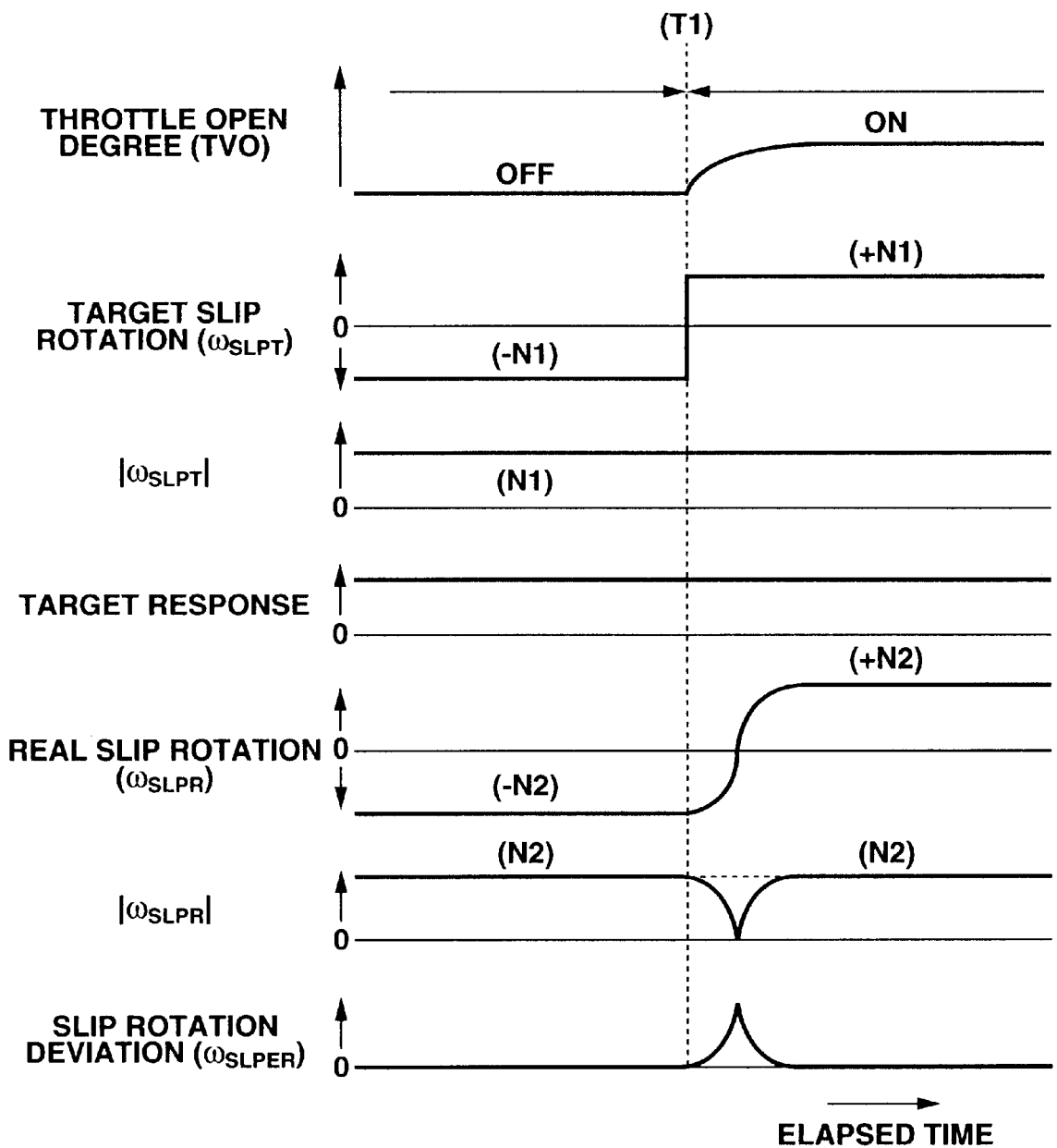
FIG. 16 is an operation time-chart similar to FIG. 11, but showing a case of another known slip control system.

This will be well understood from the following explanation directed to the time-chart of FIG. 16.

That is, if, just at a moment T1, a change is carried out from the slip control under coast running condition to that under drive running condition, the target slip rotation speed ωSLPT is changed from −N1 to +N1 and the real slip rotation speed ωSLPR is changed from −N2 to +N2.

However, in the slip control system of the publication 11-141677, an absolute value N1 of the values −N1 and +N1 and an absolute value N2 of the values −N2 and +N2 are used as the target slip rotation speed ωSLPT and the rear slip rotation speed ωSLPR in both coast running condition and drive running condition. Accordingly, as is seen from the graph, a target response shows no change even at the moment T1 when the condition changes from coats running condition to drive running condition. Thus, a desirable slip control response intended is not realized, which is the third weak point.

In view of the above-mentioned weak points inevitably possessed by the slip control systems of the publications, the present invention is provided, which will be described in detail in the following.

Figure 1:
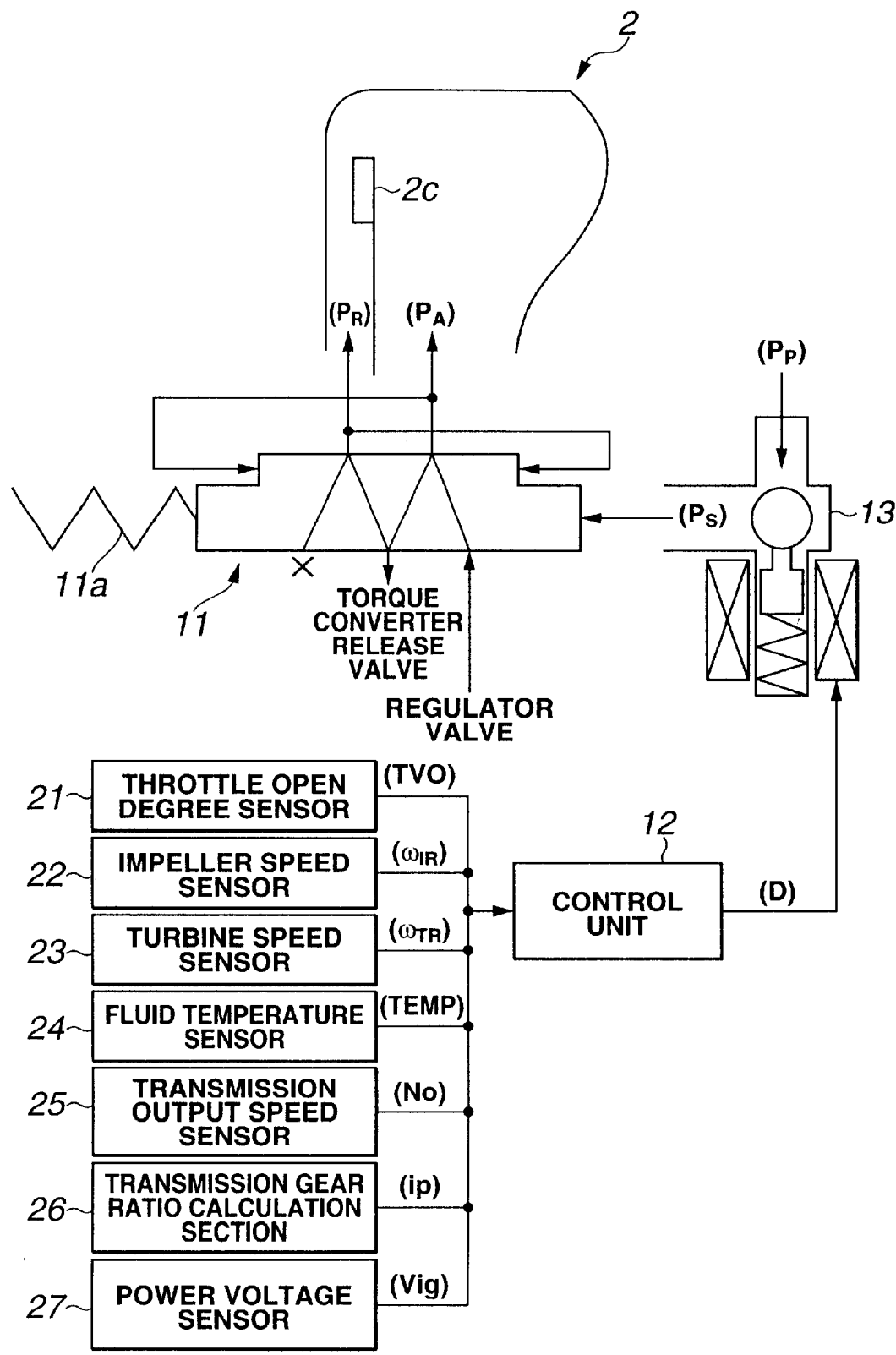
FIG. 1 is a diagram showing a slip control system of the present invention.

FIG. 1 shows schematically a slip control system of a torque converter according to the present invention.

In the drawing, denoted by numeral 2 is a lock-up type torque converter which is incorporated with an automatic transmission (not shown). Although not shown in detail, the lock-up type torque converter 2 comprises a pump impeller (as an input element) connected to a crankshaft of an associated engine, a turbine runner (as an output element) connected to an input shaft of the automatic transmission and a lock-up clutch 2c which can establish a locked engagement between the pump impeller and the turbine runner.

The engaging force of the lock-up clutch 2c is determined by a pressure difference (viz., lock-up clutch engaging pressure) between an applying pressure PA and a releasing pressure PR which are applied to opposed sides of the clutch 2c. That is, when the applying pressure PA is lower than the releasing pressure PR, the lock-up clutch 2c is released to uncouple the pump impeller and the turbine runner thereby allowing the torque converter 2 to operate in the torque converter mode. In this torque converter mode, the slip control is not needed.

While, when the applying pressure PA is higher than the releasing pressure PR, the lock-up clutch 2c is engaged with a force according to the pressure difference therebetween. Upon this, the torque converter 2 is subjected to a slip control condition wherein the slip control is carried out in accordance with the engaging force of the lock-up clutch 2c.

When, under this condition, the pressure difference becomes higher than a predetermined degree, the lock-up clutch 2c becomes fully engaged to achieve the locked engagement between the pump impeller and the turbine runner. Of course, under this condition, there is no relative rotation between the pump impeller and the turbine runner. That is, the torque converter 2 is allowed to operate in the lock-up mode.

The applying pressure PA and the releasing pressure PR are controlled or determined by a slip control valve 11. That is, as shown, upon receiving an instruction signal from a control unit 12, a lock-up solenoid 13 applies the slip control valve 11 with a signal pressure PS for controlling the applying pressure PA and the releasing pressure PR. That is, a duty control is carried out in the control unit 12 for controlling the lock-up solenoid 13. The control unit 12 is a microcomputer which comprises a central processing unit (CPU), read-only memory (ROM), random-access memory (RAM) and input and output interfaces.

The slip control valve 11 and the lock-up solenoid 13 are of a known type, which will be briefly described in the following.

That is, the lock-up solenoid 13 uses a given pilot pressure PP as a base pressure, and increases the signal pressure PS in accordance with increase in a solenoid drive duty D from the control unit 12.

Figure 2:
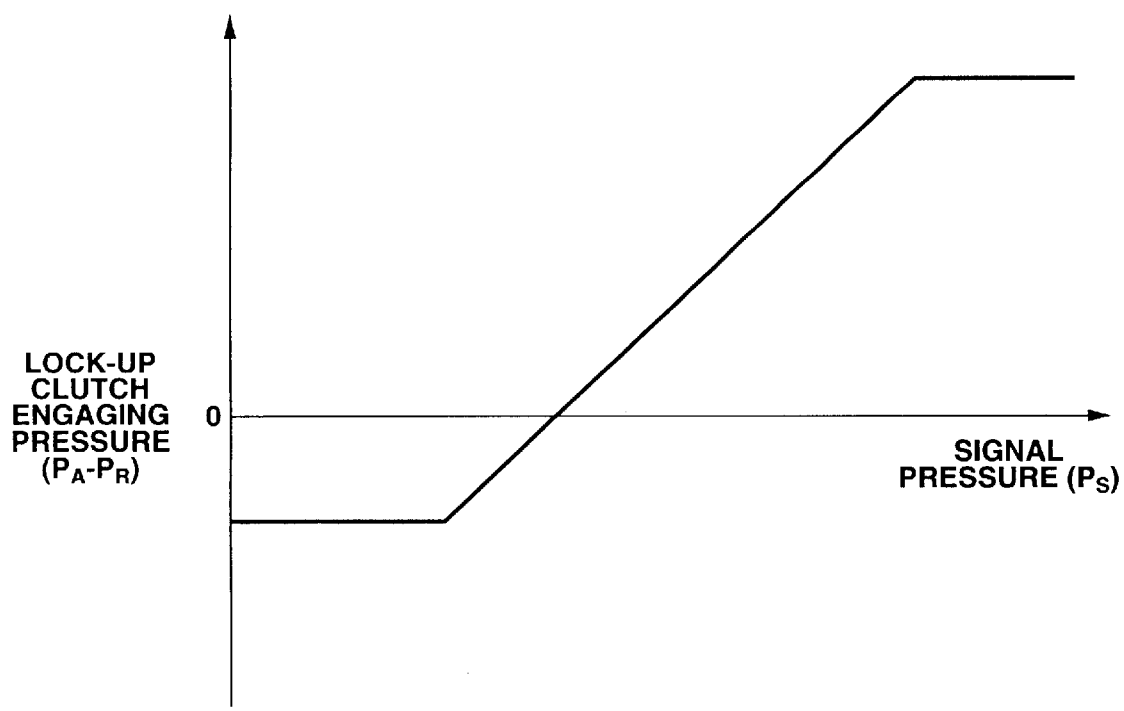
FIG. 2 is a graph showing a relation between a signal pressure outputted from a lock-up solenoid and a lock-up clutch engaging pressure.

The slip control valve 11 is constructed to receive on its one side the signal pressure PS and the releasing pressure PR fed back thereto and on its other side a biasing force of a spring 11a and the applying pressure PA fed back thereto. With this construction, the slip control valve 11 shows such a characteristic as shown in the graph of FIG. 2. That is, with increase of the signal pressure Ps, a lock-up clutch engaging pressure (PA−PR), which is represented by a difference between the applying pressure PA and the releasing pressure PR, shows the characteristic of the bent line including an inclined section extending between an initial flat section and a final flat section.

It is to be noted that a negative value of the lock-up clutch engaging pressure (PA-PR) represents PR>PA and has a meaning of causing the torque converter 2 to operate in the torque converter mode. While, a positive value of the lock-up clutch engaging pressure (PA−PR) represents PA>PR and has such a meaning that with increase of the value, the engaging capacity of the lock-up clutch 2c is increased to largely restrict the slip rotation of the torque converter 2 and finally cause the torque converter 2 to operate in the lock-up mode.

Referring back to FIG. 1, into the control unit 12, there are inputted various information signals which are a signal from a throttle open degree sensor 21, that represents an open degree TVO of a throttle valve (viz., engine load), a signal from an impeller speed sensor 22, that represents a rotation speed ωIR of the pump impeller (viz., engine speed), a signal from a turbine speed sensor 23, that represents a rotation speed ωTR of the turbine runner (viz., output rotation speed of the torque converter), a signal from a fluid temperature sensor 24, that represents a temperature TEMP of the operation fluid of the automatic transmission (viz., torque converter 2), a signal from a transmission output speed sensor 25, that represents a rotation speed No of the transmission output shaft (which corresponds to a vehicle speed VSP), a signal from a transmission gear ratio calculation section 26, that represents a ratio iP between input and output speeds of the transmission, and a signal from a power voltage sensor 27, that represents a voltage Vig of a power source.

Based on these information signals, the control unit 12 carries out various calculations as shown in the block diagram of FIG. 3 to derive the drive duty D for the lock-up solenoid 13 and correct the lock-up solenoid drive duty D in accordance with the power voltage Vig thereby to perform a slip control which will be described in detail in the following.

Figure 3:
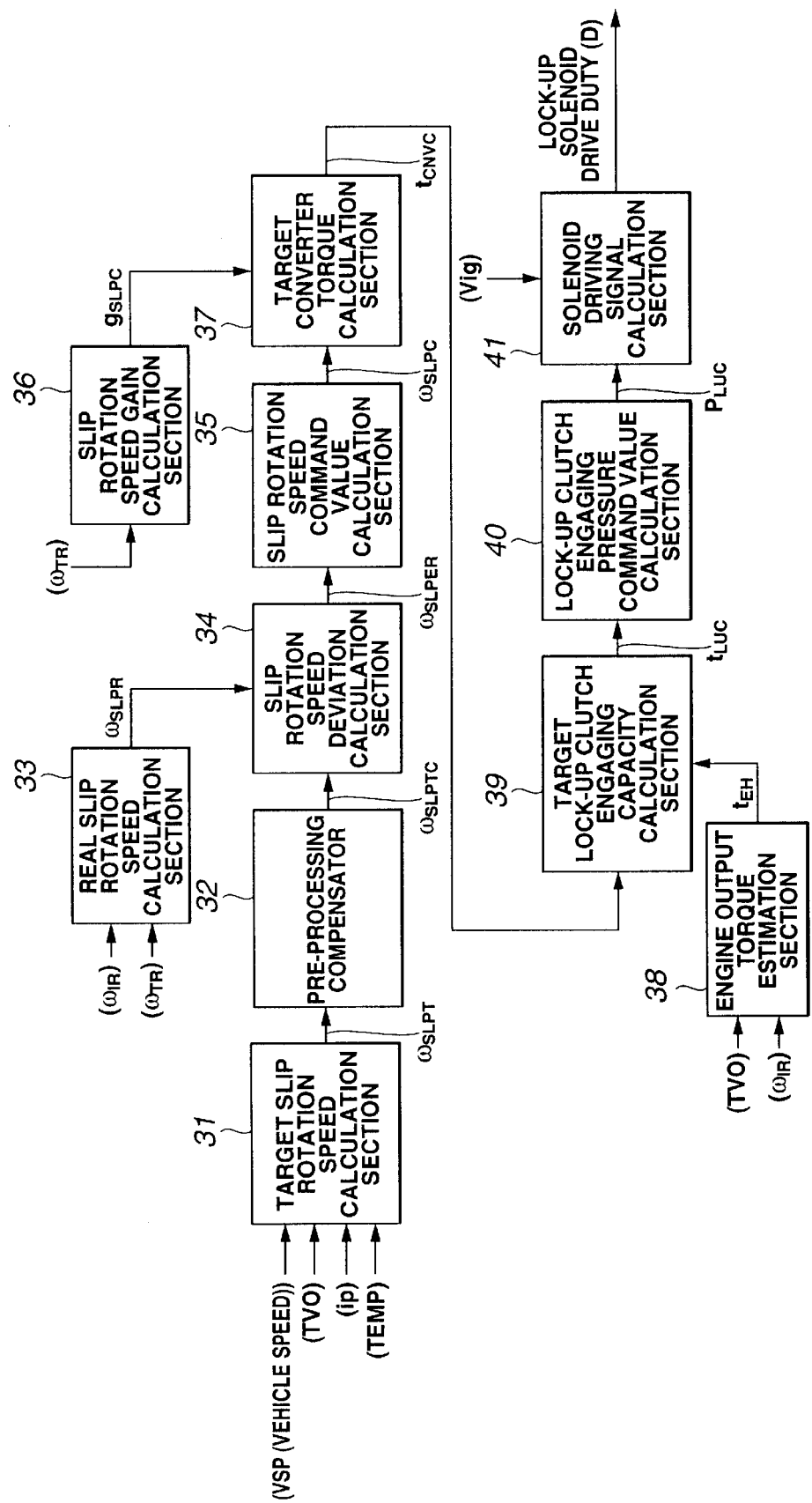
FIG. 3 is a block diagram showing a series of various function sections employed in the slip control system of the present invention.

In the block diagram of FIG. 3, denoted by numeral 31 is a target slip rotation speed calculation section which, based on the vehicle speed VSP (viz., No), throttle open degree TVO, transmission gear ratio ip of an associated transmission and fluid temperature TEMP of the converter (and thus the transmission), determines and decides a target slip rotation speed ωSLPT within the optimum range that can avoid or minimize torque fluctuation and residual noises. The target slip rotation speed ωSLPT is fed to a pre-processing compensator 32. This compensator 32 is a compensating filter that sets a compensated target slip rotation speed ωSLPTC that can realize the target slip rotation speed ωSLPT at a response or timing desired by the designer of the slip control system. That is, by passing the target slip rotation speed ωSLPT through the filter, the compensated target slip rotation speed ωSLPTC is derived.

Designated by numeral 33 is a real slip rotation speed calculation section which, based on the rotation speeds ωIR and ωTR of the pump impeller and turbine runner, calculates a real slip rotation speed ωSLPR of the torque converter 2. Specifically, the real slip rotation speed ωSLPR is obtained by subtracting the rotation speed ωTR of the turbine runner from the rotation speed ωIR of the pump impeller.

Accordingly, the real slip rotation speed ωSLPR shows a positive value when the associated vehicle assumes drive running condition wherein the rotation speed ωIR of the pump impeller is higher than the rotation speed ωTR of the turbine runner. While, the real slip rotation speed ωSLPR shows a negative value when the vehicle assumes coast running condition wherein the rotation speed ωIR of the pump impeller is lower than the rotation speed ωTR of the turbine runner.

For matching the above, the target slip rotation speed ωSLPT from the target slip rotation speed calculation section 31 is not subjected to an absolute value processing. That is, the target slip rotation speed ωSLPT has a positive or negative polarity that agree with that of the real slip rotation speed ωSLPR.

The target slip rotation speed ωSLPT and the real slip rotation speed ωSLPR are both led to a slip rotation speed deviation calculation section 34 where a slip rotation speed deviation ωSLPER between the target slip rotation speed ωSLPT and the real slip rotation speed ωSLPR is calculated every small moment "t".

That is, for the calculation, the following equation is used.

$$\omega\text{SLPER}(t) = \omega\text{SLPT}(t) - \omega\text{SLPR}(t) \tag{5}$$

The slip rotation deviation ωSLPER is fed to a slip rotation speed command value calculation section 35 where based on the slip rotation deviation ωSLPER, a slip rotation speed command value ωSLPC is calculated which is used for making the real slip rotation speed ωSLPR matched with the target slip rotation speed ωSLPT by eliminating the slip rotation deviation ωSLPER through the known proportional integral control (viz., PI control).

For the calculation, the following equation is used.

$$\omega\text{SLPC}(t) = K_P \cdot \omega\text{SLPER}(t) + (K_I/S) \cdot \omega\text{SLPER}(t) \tag{6}$$

wherein:
  $K_P$: proportional control constant
  $K_I$: integral control constant
  $S$: differential operator In the following, the relation between a converter torque tcnv, a slip rotation speed ωSLP and a turbine rotation speed ωTR, which are previously obtainable from the transmission performance of the torque converter 2, will be described with reference to the graph of FIG. 6.

In the graph, the axis of abscissas shows the turbine rotation speed ωTR and the axis of ordinates shows a slip rotation speed gain gSLP that is the ratio of the slip rotation speed ωSLP to the converter torque tcnv.

That is, the slip rotation speed gain gSLP is obtained from the following equation.

$$g\text{SLP} = \omega\text{SLP}/t\text{cnv} \tag{7}$$

In other words, $$t\text{cnv} = \omega\text{SLP}/g\text{SLP} \tag{8}$$

As shown in the graph, the slip rotation speed gain gSLP shows different characteristic lines in drive and coast running conditions, and the speed gain gSLP in either running condition varies in accordance with the turbine rotation speed ωTR.

Figure 4:
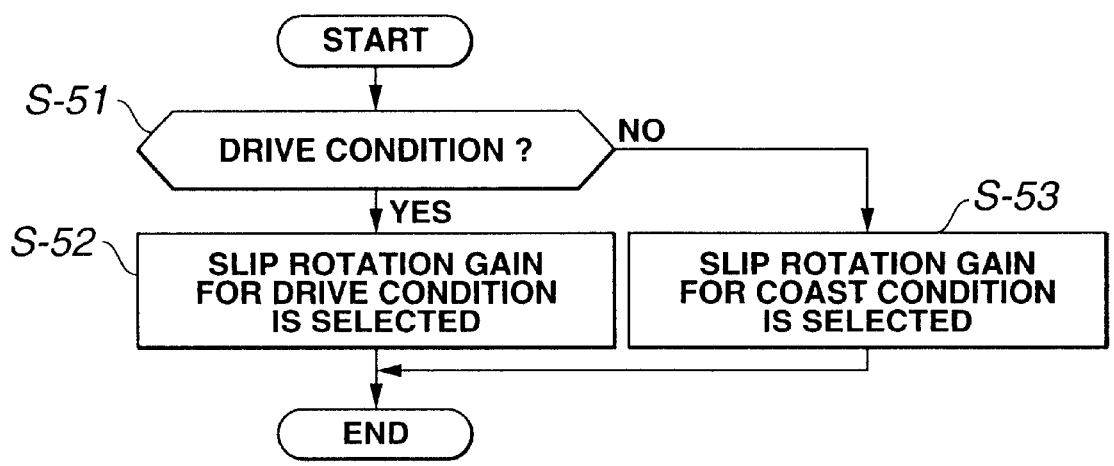
FIG. 4 is a flowchart showing programmed operation steps executed by a slip rotation speed gain calculation section of the block diagram of FIG. 3.

Referring back to FIG. 3, denoted by numeral 36 is a slip rotation speed gain calculation section which, based on the recognition depicted in FIG. 6, derives a slip rotation speed gain gSLPC by carrying out programmed steps shown in the flowchart of FIG. 4. That is, at step S-51, judgement is carried out as to whether the current running condition is drive condition or not. If YES, that is, when the condition is drive running condition, the operation flow goes to step S-52 to look up a slip rotation speed gain gSLPC in the characteristic line (or map) of FIG. 6 for drive running condition, with reference to the turbine rotation speed ωTR. While, if NO at step S-51, that is, when the condition is the coast running condition, the operation flow goes to step S-53 to look up a slip rotation speed gain gSLPC in the other characteristic line (or map) for coast running condition, with reference to the turbine rotation speed ωTR.

If desired, for dealing with an excessively frequent change of the slip rotation speed gain gSLPC and abrupt change of the same, the slip rotation speed gain gSLPC thus looked up may be passed through a low pass filter, whose first-order lag time constant is TSLP, to obtain a filtered value gSLPF(t).

That is:

$$g\text{SLPF}(t) = [1/(T\text{SLP} \cdot S + 1)] g\text{SLPC}(t) \tag{9}$$

Actually, usage of the filtered value gSLPF(t) in place of the slip rotation speed gain gSLPC can suppress or at least minimize undesirable effect on the slip control, that would be caused by abrupt change of the slip rotation speed gain and excessively frequent change of the same. That is, usage of such filtered value gSLPF(t) brings about a stable operation in the slip control.

Referring back to FIG. 3, the slip rotation speed gain gSLPC from the section 36 and the slip rotation command value ωSLPC from the section 35 are fed to a target converter torque calculation section 37.

In this section 37, by putting the slip rotation speed gain gSLPC and the slip rotation command value ωSLPC into the equation of (8), a target converter torque tCNVC for achieving the slip rotation command value ωSLPC at the turbine rotation speed ωTR is obtained.

That is:

$$t\text{CNVC}(t) = \omega\text{SLPC}(t)/g\text{SLPC} \tag{10}$$

Figure 7:
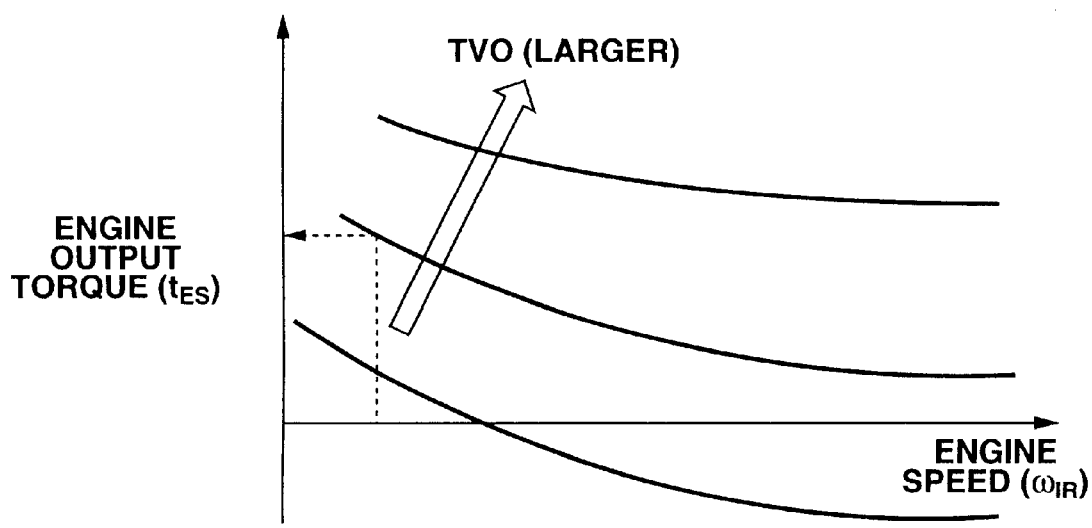
FIG. 7 is a graph showing a relation between an engine throttle opening, an engine speed and an engine output torque.

Denoted by numeral 38 is an engine output torque estimation section. In this section 38, using an engine performance curve as shown in FIG. 7, a stationary value tES of engine output torque is looked up with reference to the engine speed ωIR and the throttle open degree TVO. Then, the stationary value tES is passed through a filter whose time constant TED corresponds to a dynamic lag of the engine to derive an estimated engine output torque tEH which is much closer to an actual value.

That is:

$$t\text{EH}(t) = [1/(T\text{ED} \cdot S + 1)] t\text{ES}(t) \tag{11}$$

The target converter torque tCNVC from the section 37 and the estimated engine output torque tEH from the section 38 are fed to a target lock-up clutch engaging capacity calculation section 39. In this section 39, a target lock-up clutch engaging capacity tLUC is obtained from the following equation.

$$t\text{LUC}(t) = t\text{EH}(t) - t\text{CNVC}(t) \tag{12}$$

Figure 5:
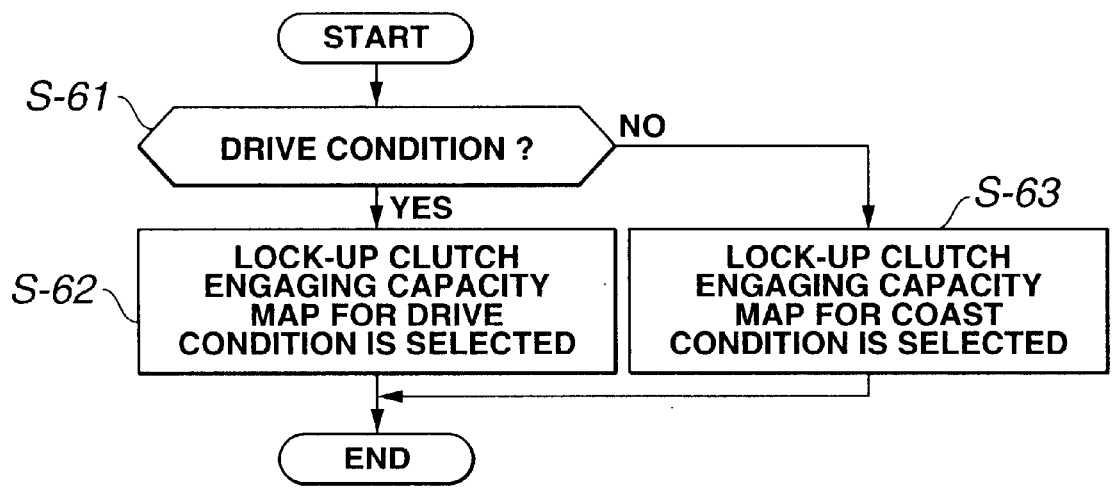
FIG. 5 is a flowchart showing programmed operation steps executed by a lock-up clutch engaging pressure command value calculation section of the block diagram of FIG. 3.

The target lock-up clutch engaging capacity tLUC thus obtained is fed to a lock-up clutch engaging pressure command value calculation section 40. In this section 40, a lock-up clutch engaging pressure command value P$_{LUC}$ for achieving the target lock-up clutch engaging capacity tL$_{UC}$ is looked up from one of maps of FIGS. 8 and 9 which has been selected as a result of judgement of FIG. 5.

Figure 9:
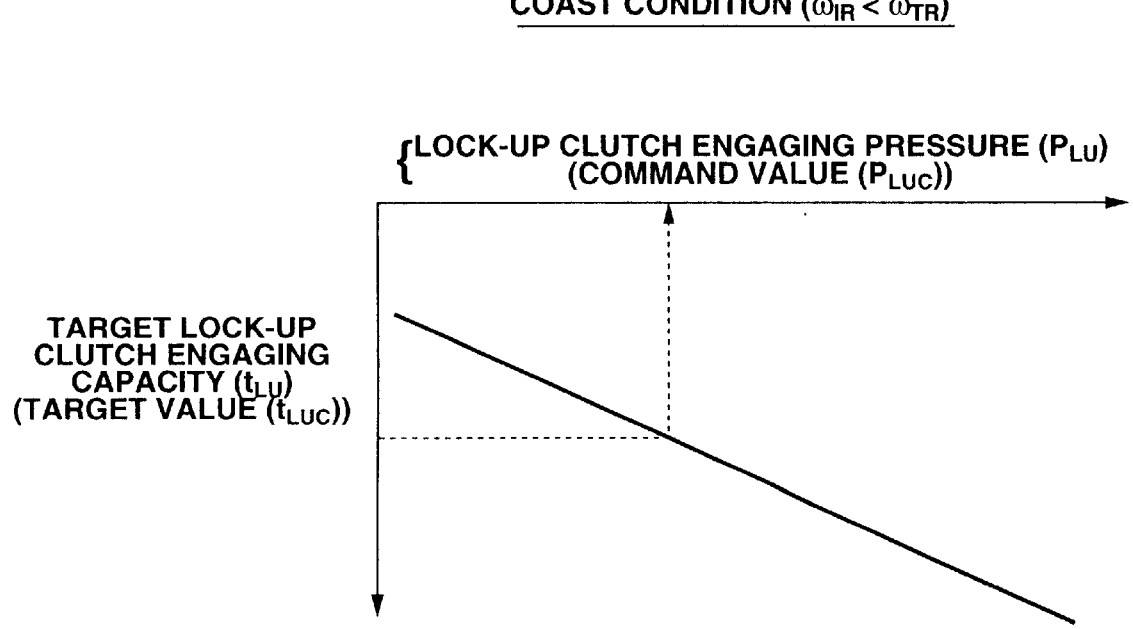
FIG. 9 is a graph showing a relation between the lock-up clutch engaging pressure and the lock-up clutch engaging capacity in coast running condition.

Each of FIGS. 8 and 9 is a map for showing the relation between the lock-up clutch engaging pressure P$_{LU}$ and the target lock-up clutch engaging capacity tL$_U$. However, FIG. 8 is the map selected in drive running condition, and FIG. 9 is the map selected in coast running condition. These maps are previously provided through various experiments.

Referring back to FIG. 5, there is shown a flowchart for carrying out the judgement. At step S-61, judgement is carried out as to whether the running condition is drive running condition or not. If YES, that is, when the condition is drive running condition, the operation flow goes to step S-62 to select the map for drive running condition. In this case, using the map of FIG. 8, a lock-up clutch engaging pressure command value P$_{LUC}$ corresponding to the target lock-up clutch engaging capacity tL$_{UC}$ is looked up. While, if NO at step S-61, that is, when the condition is coast running condition, the operation flow goes to step S-63 to select the map for coast running condition. In this case, using the map of FIG. 9, a lock-up clutch engaging pressure command value P$_{LUC}$ corresponding to the target lock-up clutch engaging capacity tL$_{UC}$ is looked up.

Referring back to FIG. 3, the lock-up clutch engaging pressure command value P$_{LUC}$ from the section 40 is fed to a solenoid driving signal calculation section 41. In this section 41, a lock-up solenoid drive duty D for making the real lock-up clutch engaging pressure matched with the lock-up clutch engaging pressure command value P$_{LUC}$ is determined. However, in this case, for avoiding an effect of voltage fluctuation of a power source V$_{ig}$, the lock-up solenoid drive duty D is suitably corrected before being fed to the lock-up solenoid of FIG. 1.

In the following, various advantages given by the slip control system of the present invention will be described.

First, as is described hereinabove, two types of maps, viz., a map of FIG. 8 for drive running condition and a map of FIG. 9 for coast running condition, are provided as a map system that shows the relation between a target lock-up clutch engaging capacity tL$_{UC}$ and a lock-up clutch engaging pressure command value P$_{LUC}$. Considering that the lock-up clutch engaging pressure command value P$_{LUC}$ is used for realizing a target lock-up clutch engaging capacity tL$_{UC}$ through which a real slip rotation speed ωSLPR of the torque converter is directed toward a target slip rotation speed ωSLPTC, the slip control effected by the slip control system of the present invention is accurately carried out in both drive running condition and coast running condition even when the torque converter has been so designed as to be mainly used in drive running condition. Of course, in such torque converter, the ideal map for looking up the lock-up clutch engaging capacity would inevitably differ between drive and coast running conditions.

Accordingly, it never occurs that against the demand for increasing the slip rotation speed of the torque converter, the slip rotation speed is reduced contrarily due to inevitable increase of the lock-up clutch engaging pressure, which would take place in the system of the above-mentioned publication 11-82726.

Second, as shown in FIG. 8, the map to be selected in drive running condition is so provided that with increase of the lock-up clutch engaging pressure command value P$_{LUC}$, the target lock-up clutch engaging capacity tL$_{UC}$ increases, and as shown in FIG. 9, the map to be selected in coast running condition is so provided that with increase of the lock-up clutch engaging pressure command value P$_{LUC}$, the target lock-up clutch engaging capacity tL$_{UC}$ decreases. That is, the above-mentioned first weak point is assuredly solved.

That is, these maps are well up in the actual situation of the torque converter in both drive and coast running conditions. That is, for example, upon demand for increasing the slip rotation speed, the slip rotation speed is assuredly increased, unlike in the case of the above-mentioned known slip control system.

Third, as is shown in FIG. 6, the function of the slip rotation speed gain gSLPC to the torque converter output rotation speed ωTR (or turbine rotation speed) has different values in drive running condition and coast running condition, and as is seen from FIG. 3, for obtaining the slip rotation speed gain gSLPC at the slip rotation speed gain calculation section 36, different or dedicated maps are used in drive running condition and coast running condition.

Accordingly, even when the slip rotation speed gains in drive and coast running conditions differ from each other, the accuracy in obtaining the target converter torque can be increased.

That is, actually, between the slip rotation speed gain gSLPC and the torque converter output rotation speed ωTR (or turbine rotation speed), the slip-rotation shows opposite directions in drive and coast running conditions, and thus, as is seen from FIG. 6, the slip rotation speed gains gSLPC in drive and coast running conditions differ from each other. That is, although the slip rotation speed gains gSLPC in the respective running conditions exhibit different values to the same torque converter output rotation speed ωTR (or turbine rotation speed), the slip rotation speed gains gSLPC can be accurately derived using the difference positively.

Accordingly, the slip rotation speed gain gSLPC in drive running condition and the slip rotation speed gain gSLPC in coarse running condition are both accurately obtained for the slip rotation. That is, according to this advantage, the above-mentioned second weak point of the system of the publication 11-82726 is solved.

Figure 10:
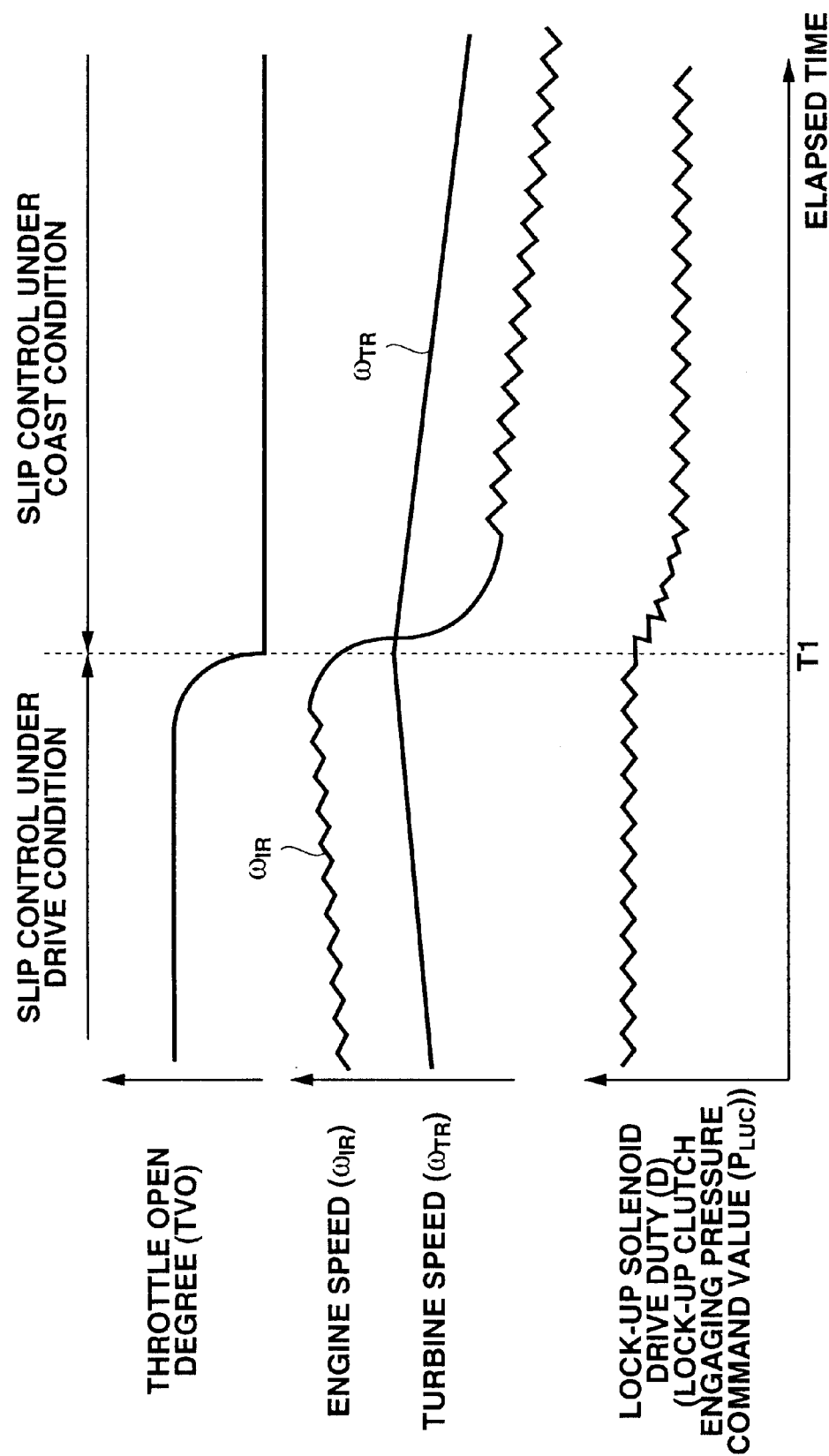
FIG. 10 is an operation time-chart of the slip control around a time when a vehicle running condition changes from drive running condition to coast running condition.

This will be well understood from the following explanation directed to FIG. 10.

That is, if, just at a moment T1, the throttle open degree TVO is changed to a smaller value changing the condition from drive running condition to coast running condition, the change of the engine rotation speed ωIR appearing after the moment T1 shows a certain stability in the slip rotation. In fact, this stable slip rotation is not expected in the known slip control system of the publication 11-82726 that has been mentioned with reference to the time-chart of FIG. 14. Thus, in the present invention, undesired shocks and residual noises, which would be caused by inaccurate slip rotation, are eliminated or at least minimized. Furthermore, undesired phenomenon wherein the torque converter becomes into the torque converter mode without properly keeping the slip condition, which has been mentioned with reference to the time-chart of FIG. 15, is eliminated. Thus, according to the invention, the fuel saving effect featured by the slip control is obtained.

Furthermore, in the present invention, the target slip rotation speed calculation section 31 and the real slip rotation calculation section 33 (see FIG. 3) have not applied an absolute value processing to the target slip rotation speed ωSLPT and the real slip rotation speed ωSLPR, so that the values ωSLPT and ωSLPR have a polarity, that is, show positive or negative form.

Figure 11:
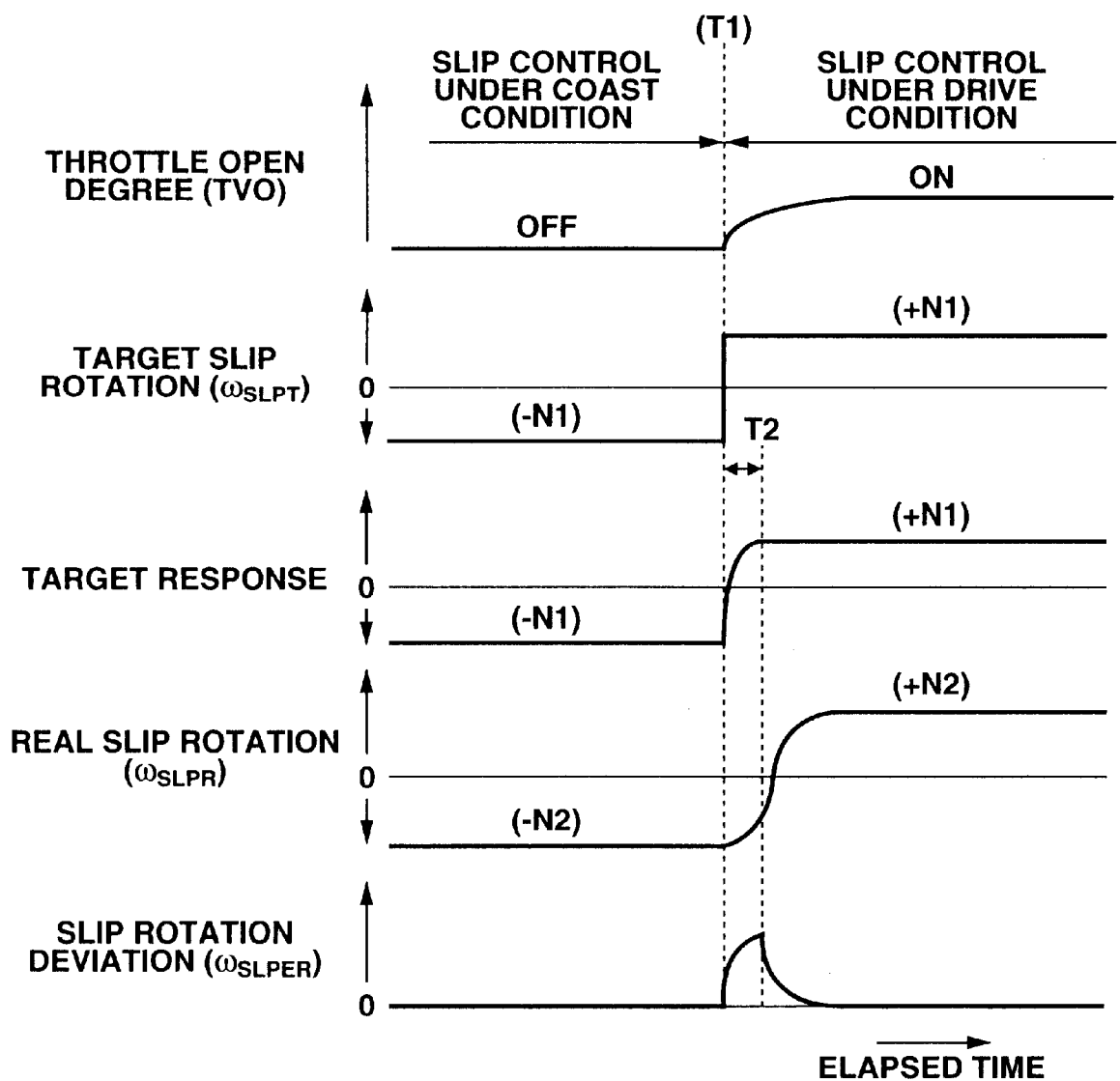
FIG. 11 is an operation time-chart of the slip control around a time when the vehicle running condition changes from coast running condition to drive running condition.

Accordingly, as is seen from the time-chart of FIG. 11, even when the target slip rotation −N1 in coast running condition before the moment T1 and the target slip rotation +N1 in drive running condition after the moment T1 show the same absolute value N1, the target slip rotation speed ωSLPT fed to the preprocessing compensator 32 shows different values in drive and coast running conditions respectively. Accordingly, the change from coast running condition to drive running condition forces the compensator 32 to output a difference.

Furthermore, since the real slip rotation −N2 or +N2 is used for the slip control without being subjected to an absolute value processing, a target response is assuredly realized upon change from coast running condition to drive running condition and vice versa, as is understood from the change of target response appearing the moment T1 and the moment T2. Thus, the above-mentioned third weak point is solved in the present invention.

In the following, modifications of the present invention will be described.

In the above description, it is explained that the slip rotation speed gain gSLPC calculated in the section 36 is directly used or filtered by a low-pass filter before the use. However, if desired, the slip rotation speed gain per se may be fixed in each of drive and coast running conditions.

In place of using the maps of FIGS. 8 and 9, a map for the coast running condition may be provided by simply reversing the map for the drive running condition.

In place of the impeller rotation speed ωIR detected by the impeller speed sensor 22, an engine rotation speed detected by an engine rotation sensor (not shown) may be used. Furthermore, if the transmission is of a V-belt type continuously variable transmission, the rotation speed of a primary pulley may be used in place of the turbine rotation speed ωTR detected by the turbine speed sensor 23.

The entire contents of Japanese Patent Application 2000-386495 (filed Dec. 20, 2000) are incorporated herein by reference.

Although the invention has been described above with reference to the embodiment of the invention, the invention is not limited to such embodiment as described above. Various modifications and variations of such embodiment may be carried out by those skilled in the art, in light of the above descriptions.

What is claimed is:

1. A slip control system of a torque converter with a lock-up clutch, the slip control system controlling a slip rotation speed between input and output elements of the torque converter by controlling an engaging condition of the lock-up clutch, said slip control system comprising:

a sensor that detects a speed difference between the input and output elements of said torque converter;

a sensor that detects an operation condition of a throttle valve of the engine;

a sensor that detects an output torque of the engine;

an actuator that controls the engaging condition of the lock-up clutch in accordance with an instruction signal applied thereto; and a controller which is configured to carry out:

calculating a target slip rotation speed of the torque converter based on a vehicle speed and an open degree of the throttle valve;

calculating a running condition of the vehicle based on the operation condition of the throttle valve, said running condition including a drive condition wherein the speed of the input element of the torque converter is higher than that of the output element and a coast condition wherein the speed of the input element is lower than that of the output element;

calculating a torque converter characteristic with reference to a speed of the output element of the torque converter and the running condition of the vehicle, said torque converter characteristic being represented by a relation between a converter torque to be transmitted by the torque converter and a slip rotation of the torque converter;

calculating a target converter torque based on said torque converter characteristic, said target converter torque being a converter torque provided when the torque converter carries out a slip rotation at the target slip rotation speed;

calculating a target lock-up clutch engaging torque based on said target converter torque and the engine torque; and outputting an instruction signal to said actuator to provide the lock-up clutch with the target lock-up clutch engaging torque.

2. A slip control system as claimed in claim 1, in which said target slip rotation speed of the torque converter is calculated based on a transmission gear ratio and a fluid temperature of the torque converter in addition to said vehicle speed and the open degree of the throttle valve.

3. A slip control system as claimed in claim 1, in which said target slip rotation speed is treated by a pre-processing compensator to provide a compensated target rotation speed.

4. A slip control system as claimed in claim 1, in which said controller is configured to further carry out:

calculating a real slip rotation speed of the torque converter based on speeds of said input and output elements of the torque converter;

calculating a slip rotation speed deviation between the target slip rotation speed and the real slip rotation speed; and calculating a slip rotation speed command value based on said slip rotation speed deviation, said slip rotation speed command value being used for calculating said target converter torque together with said torque converter characteristic.

5. A slip control system as claimed in claim 1, in which said controller is configured to further carry out looking up a lock-up clutch engaging pressure command value for achieving the target lock-up clutch engaging torque from a map which shows a relation between a lock-up clutch engaging pressure and a target lock-up clutch engaging torque with reference to the running condition of the vehicle, said lock-up clutch engaging pressure command value being used for producing said instruction signal fed to said actuator.

6. A slip control system as claimed in claim 1, in which said torque converter characteristic is represented by maps previously provided for both the drive and coast conditions, each map showing a relation between the speed of the output element of the torque converter and a slip rotation speed gain of the torque converter.

7. A slip control system as claimed in claim 3, in which said pre-processing compensator is a compensating filter which filters the target slip rotation speed for obtaining the compensated target slip rotation speed.

8. A slip control system as claimed in claim 4, in which said real slip rotation speed of the converter is obtained by subtracting the speed of the output element of the converter from the speed of the input element of the same.

9. A slip control system as claimed in claim 8, in which the slip rotation speed deviation is obtained every small moment by subtracting the real slip rotation speed from the target slip rotation speed.

10. A slip control system as claimed in claim 9, in which said slip rotation speed command value is obtained by applying the slip rotation speed deviation with a proportional integral (PI) control.

11. A slip control system as claimed in claim 6, in which, for producing the maps, said slip rotation speed gain is treated by a low pass filter.

12. A slip control system as claimed in claim 1, in which said output torque of the engine is calculated based on the engine speed and the opening degree of said throttle valve.

13. A slip control system as claimed in claim 12, in which said estimated engine speed is treated by a filter whose time constant corresponds to a dynamic lag of the engine.

14. A slip control system as claimed in claim 1, in which said target lock-up clutch engaging torque is obtained by subtracting the target converter torque from the engine output torque.

15. A slip control system as claimed in claim 5, in which the map for the drive condition shows a relation wherein with increase of the lock-up clutch engaging pressure, the target lock-up clutch engaging torque is increased, and in which the map for the coast drive condition shows a relation wherein with increase of the lock-up clutch engaging pressure, the target lock-up clutch engaging torque is decreased.

16. In a slip control apparatus of a torque converter with a lock-up clutch, the slip control apparatus controlling a slip rotation speed between input and output elements of the torque converter by controlling an engaging condition of the lock-up clutch, said slip control apparatus including a sensor that detects a speed difference between the input and output elements of said torque converter; a sensor that detects an operation condition of a throttle valve of the engine; a sensor that detects an output torque of the engine; and an actuator that controls the engaging condition of the lock-up clutch in accordance with an instruction signal applied thereto, method of controlling the slip control apparatus, comprising:

calculating a target slip rotation speed of the torque converter based on a vehicle speed and an open degree of the throttle valve;

calculating a running condition of the vehicle based on the operation condition of the throttle valve, said running condition including a drive condition wherein the speed of the input element of the torque converter is higher than that of the output element and a coast condition wherein the speed of the input element is lower than that of the output element;

calculating a torque converter characteristic with reference to a speed of the output element of the torque converter and the running condition of the vehicle, said torque converter characteristic being represented by a relation between a converter torque to be transmitted by the torque converter and a slip rotation of the torque converter;

calculating a target converter torque based on said torque converter characteristic, said target converter torque being a converter torque provided when the torque converter carries out a slip rotation at the target slip rotation speed;

calculating a target lock-up clutch engaging torque based on said target converter torque and the engine torque; and outputting an instruction signal to said actuator to provide the lock-up clutch with the target lock-up clutch engaging torque.

* * * * *